(12) United States Patent
Yanagiguchi et al.

(10) Patent No.: US 9,873,781 B2
(45) Date of Patent: Jan. 23, 2018

(54) ACRYLIC RUBBER COMPOSITION, ACRYLIC RUBBER MOLDED PRODUCT, AND METHOD FOR PRODUCING SAME

(71) Applicant: DAIKIN INDUSTRIES, LTD., Osaka-Shi, Osaka (JP)

(72) Inventors: Tomihiko Yanagiguchi, Settsu (JP); Yasuhiro Nakano, Settsu (JP); Haruhisa Masuda, Settsu (JP); Takahiro Kitahara, Settsu (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 350 days.

(21) Appl. No.: 14/371,522

(22) PCT Filed: Jan. 10, 2013

(86) PCT No.: PCT/JP2013/050321
§ 371 (c)(1),
(2) Date: Jul. 10, 2014

(87) PCT Pub. No.: WO2013/105609
PCT Pub. Date: Jul. 18, 2013

(65) Prior Publication Data
US 2014/0346707 A1 Nov. 27, 2014

(30) Foreign Application Priority Data

Jan. 12, 2012 (JP) .................................. 2012-004262

(51) Int. Cl.
*C08L 13/00* (2006.01)
*B29C 71/02* (2006.01)
(Continued)

(52) U.S. Cl.
CPC .............. *C08L 13/00* (2013.01); *B29C 71/02* (2013.01); *C08J 3/24* (2013.01); *C08J 3/246* (2013.01);
(Continued)

(58) Field of Classification Search
CPC .......... C08L 13/00; C08L 27/18; B29C 71/02; C08J 3/246; C08J 3/24; C08J 242/18; C08J 2333/08; C09K 3/1009; C09K 2200/0625
(Continued)

(56) References Cited

U.S. PATENT DOCUMENTS 3,853,809 A * 12/1974 Martin ..................... C08J 3/005
524/424
3,859,701 A * 1/1975 Huber ..................... C08J 5/124
101/401.1
(Continued)

FOREIGN PATENT DOCUMENTS

EP 1243617 A1 9/2002
JP 45-3940 B 2/1970
(Continued)

OTHER PUBLICATIONS

Communication dated Jun. 23, 2015 from the European Patent Office in counterpart application No. 13736251.3.
(Continued)

*Primary Examiner* — Nahida Sultana
(74) *Attorney, Agent, or Firm* — Sughrue Mion, PLLC

(57) ABSTRACT

The present invention aims to provide an acrylic rubber composition capable of giving an acrylic rubber molded product good in low-friction properties and non-sticking properties. The present invention relates to an acrylic rubber composition containing an acrylic rubber (A) and a fluororesin (B), the fluororesin (B) being a perfluororesin.

11 Claims, 1 Drawing Sheet

(51) Int. Cl.
*C08L 27/18* (2006.01)
*C08J 3/24* (2006.01)
*C09K 3/10* (2006.01)

(52) U.S. Cl.
CPC .......... *C08L 27/18* (2013.01); *C09K 3/1009* (2013.01); *C08J 2333/08* (2013.01); *C08J 2427/18* (2013.01); *C09K 2200/0625* (2013.01)

(58) Field of Classification Search
USPC ....................................................... 264/236
See application file for complete search history.

(56) References Cited

U.S. PATENT DOCUMENTS

| | | | | |
|---|---|---|---|---|
| 4,096,207 | A | 6/1978 | Saxon et al. | |
| 4,320,823 | A * | 3/1982 | Covaleski | C08L 13/00 156/171 |
| 4,822,654 | A * | 4/1989 | Takemura | B32B 25/14 428/36.8 |
| 5,025,058 | A * | 6/1991 | Senoo | C08K 3/22 252/601 |
| 5,095,072 | A * | 3/1992 | Kobayashi | C08L 9/02 525/199 |
| 5,100,734 | A * | 3/1992 | Miyabayashi | B32B 25/14 428/515 |
| 5,391,627 | A * | 2/1995 | Araki | C08K 5/098 474/202 |
| 5,506,322 | A * | 4/1996 | Ichikawa | C08K 5/19 524/548 |
| 5,643,979 | A * | 7/1997 | Hayashi | C08K 5/0008 524/100 |
| 5,882,012 | A * | 3/1999 | Niwa | F16J 9/14 277/407 |
| 6,619,329 | B2 * | 9/2003 | Ikemoto | B32B 25/04 138/126 |
| 6,756,445 | B1 * | 6/2004 | Irie | C08L 21/00 525/191 |
| 6,884,847 | B2 * | 4/2005 | Irie | C08L 21/00 264/164 |
| 7,264,249 | B2 * | 9/2007 | Yokoyama | F16J 15/3284 277/549 |
| 7,868,089 | B2 * | 1/2011 | Masuda | C08L 21/00 525/104 |
| 2005/0032968 | A1 | 2/2005 | Drujon et al. | |
| 2006/0100368 | A1 * | 5/2006 | Park | B82Y 30/00 525/50 |
| 2007/0225430 | A1 * | 9/2007 | Masuda | C08L 21/00 524/546 |
| 2009/0200750 | A1 * | 8/2009 | Takeno | F16J 15/324 277/569 |
| 2013/0090424 | A1 * | 4/2013 | Ikari | C08G 59/3209 524/548 |
| 2013/0280459 | A1 * | 10/2013 | Nakashima | C08L 13/00 428/36.8 |
| 2013/0280490 | A1 * | 10/2013 | Takemura | C08J 5/00 428/156 |
| 2016/0002447 | A1 * | 1/2016 | Yanagiguchi | C08L 9/02 525/199 |
| 2017/0226337 | A1 * | 8/2017 | Chen | C08L 27/18 |

FOREIGN PATENT DOCUMENTS

| | | |
|---|---|---|
| JP | 45-003940 B1 | 2/1970 |
| JP | 53-85845 A | 7/1978 |
| JP | 07-286081 A | 10/1995 |
| JP | 09-111083 A | 4/1997 |
| JP | 2006-104395 A | 4/2006 |
| WO | 2005/111140 A1 | 11/2005 |

OTHER PUBLICATIONS

International Preliminary Report on Patentability dated Jul. 15, 2014, issued by the International Searching Authority in corresponding International Application No. PCT/JP2013/050321.
International Search Report for PCT/JP2013/050321 dated Mar. 12, 2013.

\* cited by examiner

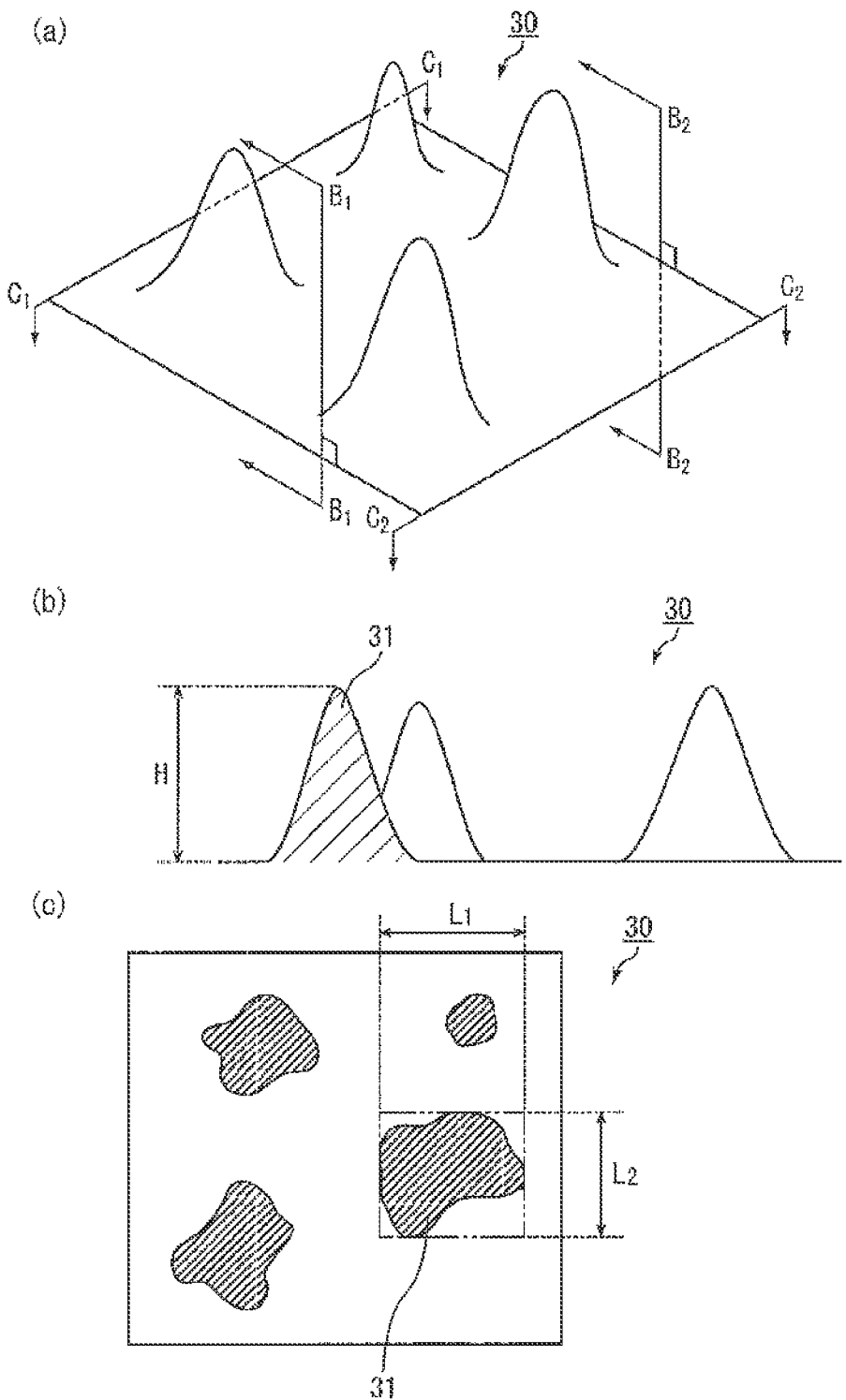

1

ACRYLIC RUBBER COMPOSITION, ACRYLIC RUBBER MOLDED PRODUCT, AND METHOD FOR PRODUCING SAME

CROSS REFERENCE TO RELATED APPLICATIONS

This application is a National Stage of International Application No. PCT/JP2013/050321 filed Jan. 10, 2013, claiming priority based on Japanese Patent Application No. 2012-004262 filed Jan. 12, 2012, the contents of all of which are incorporated herein by reference in their entirety.

TECHNICAL FIELD

The present invention relates to an acrylic rubber composition, an acrylic rubber molded product obtainable by cross-linking the rubber composition, and a method of producing the acrylic rubber molded product. The acrylic rubber molded product is suitable as various sealing materials, such as oil seals.

BACKGROUND ART

Acrylic rubbers are rubber materials combining hot oil resistance, thermal aging resistance, and weather resistance, which are widely used as automotive rubber components such as packings, seals, valve stems, and oil deflectors for the transmission or crankshaft systems.

However, the inherent elasticity of the acrylic rubbers cause the resulting molded products to have a high friction coefficient or high tackiness on their surfaces. In applications requiring low-friction properties, it is required to improve the low-friction properties on the surface of the molded product.

In the above situation, Patent Literature 1, for example, discloses an acrylic rubber composition containing 0.5 to 6 parts by weight of an alkylene bis higher fatty acid amide, based on 100 parts by weight of acrylic rubber, to reduce friction and improve friction wear characteristics.

Patent Literature 2 discloses a resin composition containing (A) a fluoropolymer including vinylidene fluoride as a main repeating unit, (B) an acrylic rubber, (C) silica, and (D) carbon black, the resin composition having a ratio of the fluoropolymer (A) to the acrylic rubber (B) of 40/60 to 90/10 (w/w) and containing the silica (C) in an amount of 10 to 40 parts by weight and the carbon black (D) in an amount of 5 to 20 parts by weight, based on 100 parts by weight of the total of the fluoropolymer (A) and the acrylic rubber (B), in an effort to provide an inexpensive, low-density resin composition that satisfies required properties including oil resistance, abrasion resistance, heat resistance, and flexibility, has a favorable extrudability, and prevents production problems.

Patent Literature 3, which aims to provide a rubber composition thermally stable at high temperatures for a long period of time, discloses a cross-linkable rubber composition containing: (A) a rubber composite in which a fluororubber and an acrylic rubber are dispersed in each other, the fluororubber including polymerized units based on hexafluoropropylene and vinylidene fluoride and/or tetrafluoroethylene and the acrylic rubber including a cross-linkable hydroxy group or a crosslinkable chlorine atom in the molecule; (B) an acid acceptor including a metal oxide and/or a metal hydroxide; and (C) a vulcanization accelerator including a quaternary ammonium salt and/or a quaternary phosphonium salt. It also teaches that the composite (A) can be obtained by mixing and dispersing fluororubber latex and acrylic rubber latex in the latex state, followed by salting-out and coagulation.

CITATION LIST

Patent Literature

Patent Literature 1: JP H9-111083 A
Patent Literature 2: JP 2006-104395 A
Patent Literature 3: JP 117-286081 A

SUMMARY OF INVENTION

Technical Problem

The present invention aims to provide an acrylic rubber composition capable of giving an acrylic rubber molded product good in low-friction and non-sticking properties; a molded product obtainable by cross-linking the rubber composition; and a method of producing the molded product.

Solution to Problem

As a result of keen studies on acrylic rubber compositions to form an acrylic rubber molded product having good low-friction properties and good non-sticking properties, the present inventors have found out that an acrylic rubber molded product obtainable by cross-linking an acrylic rubber composition containing an acrylic rubber and a fluororesin has good low-friction properties and good non-sticking properties on its surface, and thereby the inventors have completed the invention.

That is, the present invention relates to an acrylic rubber composition containing an acrylic rubber (A) and a fluororesin (B), the fluororesin (B) being a perfluororesin.

The acrylic rubber composition of the present invention preferably includes a co-coagulated composition obtainable by co-coagulating the acrylic rubber (A) and the fluororesin (B).

The fluororesin (B) is preferably at least one selected from the group consisting of tetrafluoroethylene/hexafluoropropylene copolymers, tetrafluoroethylene/hexafluoropropylene/perfluoro(alkyl vinyl ether) copolymers, and tetrafluoroethylene/perfluoro(alkyl vinyl ether) copolymers.

The acrylic rubber (A) preferably includes a polymerized unit based on at least one acrylate selected from the group consisting of ethyl acrylate, butyl acrylate, butoxy ethyl acrylate, and methoxy ethyl acrylate.

The present invention also relates to an acrylic rubber molded product obtainable by cross-linking the acrylic rubber composition.

The present invention also relates to a method of producing an acrylic rubber molded product including: (I) co-coagulating an acrylic rubber (A) and a fluororesin (B) that is a perfluororesin to provide a co-coagulated composition and then producing the acrylic rubber composition; (II) molding and cross-linking the acrylic rubber composition to provide a cross-linked molded product; and (III) heating the cross-linked molded product to a temperature equal to or higher than a melting point of the fluororesin (B) to provide an acrylic rubber molded product.

The present invention also relates to an acrylic rubber molded product obtainable by the method.

In the acrylic rubber molded product of the present invention, the acrylic rubber molded product preferably has protrusions on a surface thereof. The area ratio of regions having protrusions to the surface of the acrylic rubber molded product is preferably 0.04 or greater. The volume ratio of the fluororesin (B) to the acrylic rubber molded product is preferably 0.03 to 0.45. The area ratio of regions having protrusions is preferably at least 1.1 times the volume ratio of the fluororesin (B).

The protrusions preferably substantially consist of the fluororesin (B) in the acrylic rubber composition.

The protrusions preferably have a height of 0.1 to 30.0 μm.

The protrusions preferably have a bottom cross-sectional area of 0.1 to 2,000 μm².

The number of protrusions is preferably 500 to 60,000 per mm².

The acrylic rubber molded product of the present invention is preferably intended to be used as a sealing material.

Advantageous Effects of Invention

Having the above structure, the acrylic rubber composition of the present invention can provide an acrylic rubber molded product having good low-friction properties and good non-sticking properties.

The acrylic rubber molded product of the present invention has good low-friction properties and good non-sticking properties and thereby is useful as sealing materials, O-ring materials, packing materials, and the like.

BRIEF DESCRIPTION OF DRAWINGS

FIG. 1(a) is a schematic perspective view illustrating the shape of protrusions of an acrylic rubber molded product; FIG. 1(b) is a cross-sectional view of protrusions along the plane including the straight lines $B_1$ and $B_2$ perpendicular to the surface shown in FIG. 1(a); and FIG. 1(c) is a cross-sectional view along the plane including the straight lines $C_1$ and $C_2$ parallel with the surface shown in FIG. 1(a).

DESCRIPTION OF EMBODIMENT

The acrylic rubber composition of the present invention contains an acrylic rubber (A) and a fluororesin (B). The fluororesin (B) is a perfluororesin. Since containing the acrylic rubber (A) and fluororesin (B), the acrylic rubber composition of the present invention provides an acrylic rubber molded product having good low-friction properties and good non-sticking properties on its surface and does not impair the inherent flexibility of the acrylic rubber.

The acrylic rubber composition of the present invention can be obtained by mixing acrylic rubber (A) powder and fluororesin (B) powder separately prepared by coagulation; melt-kneading the acrylic rubber (A) and the fluororesin (B); co-coagulating the acrylic rubber (A) and the fluororesin (B), or other methods.

The acrylic rubber composition of the present invention preferably includes a co-coagulated composition obtainable by co-coagulation of the acrylic rubber (A) and the fluororesin (B) because co-coagulation allows the fluororesin (B; to be uniformly dispersed in the acrylic rubber composition, enabling production of an acrylic rubber molded product having better low-friction properties and better non-sticking properties.

If the acrylic rubber composition of the present invention includes a co-coagulated composition obtained by co-coagulating the acrylic rubber (A) and the fluororesin (B), the fluororesin (B) is expected to be uniformly dispersed in the acrylic rubber composition. Thereby, the acrylic rubber molded product obtainable by cross-linking the acrylic rubber composition of the present invention can presumably have better low-friction properties and better non-sticking properties without impairing the inherent flexibility of the acrylic rubber.

The co-coagulation can be carried out by, for example, (i) mixing an aqueous dispersion of the acrylic rubber (A) and an aqueous dispersion of the fluororesin (B) and then coagulating the mixture; (ii) adding powder of the acrylic rubber (A) to an aqueous dispersion of the fluororesin (B) and then coagulating the resulting mixture; or (iii) adding powder of the fluororesin (B) to an aqueous disporsion of the acrylic rubber (A) and then coagulating the resulting mixture.

The co-coagulation is preferably carried out by the method (i) because the resins are easily uniformly dispersed in this method. For example, the co-coagulated composition is preferably obtained by mixing an aqueous dispersion of the acrylic rubber (A) and an aqueous dispersion of the fluororesin (B), then coagulating the obtained mixture, followed by collecting and optionally drying the coagulated product. By this method, a powdery co-coagulated composition can be obtained.

In the following, the components of the acrylic rubber composition of the present invention will be described in detail.

(A) Acrylic Rubber

The acrylic rubber (A) is a polymer including a polymerized unit based on an acrylate. The acrylic rubber (A) may be a homopolymer including a polymerized unit based on one acrylate, a copolymer including polymerized units based on two or more acrylates, or a copolymer including polymerized units based on one or two or more acrylates and a polymerized unit based on a monomer copolymerizable with the acrylates.

By selecting the kind of the acrylate and the amount of the polymerized unit in the acrylic rubber (A), normal physical properties, low-temperature resistance, oil resistance, and the like of the resulting acrylic rubber composition can be controlled.

The acrylate is preferably an alkyl acrylate having a C1 to C12 alkyl group, or an alkoxy alkyl acrylate having a C1 to C12 alkoxy alkyl group.

Examples of the alkyl acrylate include methyl acrylate, ethyl acrylate, n-butyl acrylate, n-propyl acrylate, isobutyl acrylate, n-pentyl acrylate, isoamyl acrylate, n-hexyl acrylate, 2-methyl pentyl acrylate, n-octyl acrylate, 2-ethyl hexyl acrylate, n-decyl acrylate, n-dodecyl acrylate, and n-octadecyl acrylate.

Examples of the alkoxy alkyl acrylate include 2-methoxy ethyl acrylate, 2-ethoxy ethyl acrylate, 2-(n-propoxy)ethyl acrylate, 2-(n-butoxy)ethyl acrylate, 3-methoxy propyl acrylate, 3-ethoxy propyl acrylate, 2-(n-propoxy)propyl acrylate, and 2-(n-butoxy)propyl acrylate.

The amounts of polymerized units based on these acrylates are controlled to control low-temperature resistance and oil resistance of the resulting acrylic rubber composition and the molded product obtained from the acrylic rubber composition.

For example, if the copolymerization ratio of n-butyl acrylate is larger, low-temperature resistance can be improved. If the copolymerization ratio of ethyl acrylate is larger, oil resistance can be improved.

The acrylic rubber (A) is also preferably a copolymer including a polymerized unit based on an acrylate and a polymerized unit based on a monomer copolymerizable with the acrylates.

The monomer copolymerizable with the acrylates is preferably at least one monomer selected from the group consisting of methacrylate esters, vinyl acetate, cross-linking site-containing monomers (other than vinyl acetate), and ethylene.

Examples of the methacrylate ester include alkyl methacrylates and alkoxy alkyl methacrylates. The methacrylate is preferably, for example, an alkyl methacrylate having a C2 to C14 alkyl group or an alkyl methacrylate having a C2 to C14 alkoxy alkyl group.

The vinyl acetate is used to cross-link the molecules of the acrylic rubber molded product to maintain its mechanical characteristics such as elongation when the acrylic rubber molded product is heat-aged. The amount of vinyl acetate added is controlled to control the cross-linking between the molecules of the resulting acrylic rubber molded product.

The main chain of the acrylic rubber molded product may be broken by heat or ultra violet ray, decreasing mechanical characteristics such as tensile strength or elongation at break. If the vinyl acetate with a carboxy group, which is prone to cause cross-linking, is copolymerized in the main chain of the acrylic rubber (A), the carboxy group in the polymerized unit based on the vinyl acetate serves as a cross-linking site when the main chain has broken, allowing the separated molecules to be linked again by crosslinks.

The amount of the polymerized unit based on vinyl acetate is preferably 15% by mass or less for all the polymerized units in the acrylic rubber (A). If the amount of the polymerized unit based on vinyl acetate is within this range, lowering of the mechanical properties can be prevented while the thermal aging resistance of the acrylic rubber molded product can be maintained.

The cross-linking site-containing monomer is optionally copolymerized in the acrylic rubber to promote cross-linking between the molecules and to control hardness and elongation properties of the resulting acrylic rubber molded product.

The cross-linking site-containing monomer is preferably a monomer containing at least one selected from the group consisting of active chlorine, epoxy, carboxy, and hydroxy groups (the hydroxy group contained in carboxy group is excluded).

The cross-linking site-containing monomer is not particularly limited. Examples thereof include monomers containing an active chlorine such as 2-chloroethyl vinyl ether, 2-chloroethyl acrylate, vinyl benzyl chloride, vinyl chloroacetate, allyl chloroacetate, o,m,p-hydroxystyrene, monochlorovinyl acetate, chloromethylstyrene, and allyl chloride; monomers containing a carboxy group such as acrylic acid, methacrylic acid, crotonic acid, 2-pentene acid, maleic acid, fumaric acid, itaconic acid, monoalkyl maleates, monoalkyl fumarates, and cinnamic acid; and monomers containing an epoxy group such as glycidyl acrylate, glycidyl methacrylate, allyl glycidyl ether, and methallyl glycidyl ether.

The hydroxy group that can be contained in the cross-linking site-containing monomer is preferably a phenolic hydroxy group. Examples of the cross-linking site-containing monomer containing a phenolic hydroxy group include α-methyl-o-hydroxystyrene, o-chavicol, vinyl p,m-hydroxybenzoate, vinyl salicylate, eugenol, isoeugenol, p-isopropenyl phenol, o,m,p-allyl phenol, and 2,2-(o,m,p-hydroxyphenyl-4-vinyl-4-vinylacetyl)propane.

The amount of the polymerized unit based on the cross-linking site-containing monomer is preferably 10% by mass or less, more preferably 5% by mass or less for all the polymerized units in the acrylic rubber (A). If the polymerized unit based on the cross-linking site-containing monomer is used within this range, the cross-linking is performed efficiently, resulting in good hardness of the resulting acrylic rubber molded product without losing rubber elasticity. If the amount is more than 10% by mass, the resulting cross-linked product is cured, losing the rubber elasticity.

The acrylic rubber (A) may be copolymerized with other monomers copolymerizable with these monomers, to the extent that does not impair the objects of the present invention. The monomers copolymerizable with the above monomers are not particularly limited. Examples thereof include alkyl vinyl ketones such as methyl vinyl ketone; vinyl ether and allyl ether such as vinyl ethyl ether and allyl methyl ether; vinyl aromatic compounds such as styrene, α-methylstyrene, chlorostyrene, vinyltoluene, and vinylnaphthalene; vinyl nitriles such as acrylonitrile and methacrylonitrile; and ethyleneic unsaturated compound such as acrylamide, propylene, butadiene, isoprene, pentadiene, vinyl chloride, vinylidene chloride, vinyl fluoride, vinylidene fluoride, ethylene, and vinyl propionate.

If the acrylic rubber (A) contains a polymerized unit based on ethylene, the amount thereof is preferably 50% by mass or less for all the polymerized units in the acrylic rubber (A). Copolymerization with ethylene results in an acrylic rubber having remarkably improved strength.

The acrylic rubber (A) can be obtained by copolymerizing the monomers by any of the known methods, such as emulsion polymerization, suspension polymerization, solution polymerization, or bulk polymerization.

The acrylic rubber (A) preferably contains, for all the polymerized units, 40 to 95% by mass of a polymerized unit based on an acrylate and 1 to 20% by mass of a polymerized unit based on a monomer containing at least one group selected from the group consisting of an active chlorine group and a hydroxy group (the hydroxy group in the carboxy group is excluded). More preferably, the amount of the polymerized unit based on acrylate is 50 to 90% by mass, and the amount of the polymerized unit based on a monomer containing at least one group selected from the group consisting of an active chlorine group and hydroxy group (the hydroxy group in the carboxy group is excluded) is 2 to 10% by mass.

The acrylic rubber (A) can be produced by salting-out a latex which is obtained by the following polymerization method or other methods to coagulate the polymer, followed by washing and drying the coagulated product. The salting agent may be, for example, common salt.

An anionic emulsifier and sodium dioctyl sulfosuccinate (5.0 g) are dissolved in deionized water (1250 g) in a 2-liter beaker. A total amount of 300 g of a mixture of monomers to make up the acrylic rubber is added, and the resulting mixture is emulsified with a small mixer. Thereafter, the monomer emulsion is placed in a 2-liter polymerization container equipped with a ref lux cooling tube and then heated to 70° C. under a stream of nitrogen. Thereafter, a 10% aqueous solution of ammonium persulphate (10 g) is added to start the polymerization. After the start of the polymerization, the temperature inside the container is raised from the initial temperature of 70° C. to 80° C., and maintained within a range of 80° C. to 82° C. for 2 hours. Thereby, the polymerization reaction is completed.

The acrylic rubber composition of the present invention may further contain a cross-linking agent. The cross-linking agent may be appropriately selected based on factors such as the kind of the acrylic rubber and may be any of cross-linking agents typically used in cross-linking of acrylic rubber compositions. The cross-linking agent may not be used depending on the kind of the acrylic rubber, or the like factors.

The amount of the cross-linking agent added is not particularly limited. Preferably, the amount thereof is 0.1 to 10 parts by mass for 100 parts by mass of the acrylic rubber composition. If the amount is within the above range, sufficient cross-linking treatment can be performed. If the amount of the cross-linking agent is less than 0.1 parts by mass, the acrylic rubber composition is insufficiently cross-linked, which may decrease mechanical characteristics such as tensile strength and elongation at break of the resulting acrylic rubber molded product. If the amount is more than 10 parts by mass, the resulting acrylic rubber molded product may be cured, losing the elasticity.

The cross-linking agent is preferably at least one selected form the group consisting of polyamine compounds, imidazole compounds, and peroxides.

When the acrylic rubber (A) contains a polymerized unit based on a cross-linking site-containing monomer, the cross-linking agent may be appropriately selected depending on the cross-linking site-containing monomer.

For example, if the cross-linking site-containing monomer is a monomer containing a carboxy group, the cross-linking agent is preferably a polyamine compound and preferably used in combination with a guanidine compound as a cross-linking accelerator.

Examples of the polyamine compound include aromatic polyamine compounds such as 4,4'-bis(4-aminophenoxy) biphenyl, 4,4'-diaminodiphenylsulfide, 1,3-bis(4-aminophenoxy)-2,2-dimethylpropane, 1,3-bis(4-aminophenoxy)benzene, 1,4-bis(4-aminophenoxy)benzene, 1,4-bis(4-aminophenoxy)pentane, 2,2-bis[4-(4-aminophenoxy)phenyl]propane, 2,2-bis[4-(4-aminophenoxy)phenyl]sulfone, 4,4'-diaminodiphenylsulfone, bis(4-3-aminophenoxy)phenylsulfone, 2,2-bis[4-(4-aminophenoxy)phenyl]hexafluoropropane, 3,4'-diamino diphenyl ether, 4,4'-diamino diphenyl ether, 4,4'-diaminobenzanilide, and bis[4-(4-aminophenoxy)phenyl]sulfone; and aliphatic polyamine compounds such as hexamethylenediamine, hexamethylenediamine carbamate, N,N'-dicinnamylidene-1,6-hexanediamine, diethylenetriamine, triethylenetetramine, and tetraethylenepentamine.

Examples of the guanidine compound include guanidine, tetramethylguanidine, dibutylguanidine, diphenylguanidine, and di-o-tolylguanidine.

If the cross-linking site-containing monomer is a monomer containing an epoxy group, the cross-linking agent is preferably an imidazole compound. Examples of the imidazole compound include 1-methylimidazole, 1,2-dimethylimidazole, 1-methyl-2-ethylimidazole, 1-benzyl-2-methylimidazole, 1-benzyl-2-ethylimidazole, 1-benzyl-2-ethyl-5-methylimidazole, 1-benzyl-2-phenylimidazole, 1-benzyl-2-phenyl imidazole/trimellitic acid salt, 1-aminoethylimidazole, 1-aminoethyl-2-methylimidazole, 1-aminoethyl-2-ethylimidazole, 1-cyanoethyl-2-methylimidazole, 1-cyanoethyl-2-phenylimidazole, 1-cyanoethyl-2-ethyl-4-methylimidazole, 1-cyanoethyl-2-undecylimidazole, 1-cyanoethyl-2-methylimidazole trimellitate, 1-cyanoethyl-2-phenylimidazole trimellitate, 1-cyanoethyl-2-ethyl-4-methylimidazole trimellitate, 1-cyanoethyl-2-undecyl-imidazole trimellitate, 2,4-diamino-6-[2'-methylimidazolyl-(1)']ethyl-s-triazine/isocyanuric acid adduct, 1-cyanoethyl-2-phenyl-4,5-di-(cyanoethoxymethyl)imidazole, N-(2-methylimidazolyl-1-ethyl)urea, N,N'-bis-(2-methylimidazolyl-1-ethyl)urea, 1-(cyanoethylaminoethyl)-2-methylimidazole, N,N'-[2-methylimidazolyl-(1)-ethyl]-adipoyldiamide, N,N'-[2-methylimidazolyl-(1)-ethyl]-dodecandioyldiamide, N,N'-[2-methylimidazolyl-(1)-ethyl]-eicosanedioyldiamide, 2,4-diamino-6-[2'-methylimidazolyl-(1)']-ethyl-s-triazine, 2,4-diamino-6-[2'-undecylimidazolyl-(1)']-ethyl-s-triazine, 1-dodecyl-2-methyl-3-benzylimidazolium chloride, and 1,3-dibenzyl-2-methylimidazolium chloride.

If the cross-linking site-containing monomer is a monomer containing an epoxy group, the cross-linking accelerator may be a curing agent for epoxy resins, such as a pyrolytic ammonium salt, an organic acid, an acid anhydride, an amine, sulfur, a sulfur compound, or the like.

If the cross-linking site-containing monomer is not used, the cross-linking agent is preferably a peroxide. Examples of the peroxide include 3-chlorobenzoyl peroxide, t-butyl-cumyl peroxide, dicumyl peroxide, cumene hydroperoxide, benzoyl peroxide, 2,4-dichloro-benzoyl peroxide, t-butyl peroxide, t-butyl hydroperoxide, 1,1-di-(t-butylperoxy)-3,3,5-trimethylcyclohexane, n-butyl-4,4-di-(t-butylperoxy)-valerate, dicumyl peroxide, di-t-butylperoxy-isopropylbenzene, 2,5-dimethyl-2,5-di(t-butylperoxy)hexyne, 2,5-dimethyl-2,5-di(t-butylperoxy)hexane, 2,2-bis(t-butylperoxy)-4-diisopropylbenzene, and 1,3-bis(t-butylperoxy)-4-diisopropylbenzene.

The amount of the peroxide added is preferably, for example, 5 to 10 parts by mass, and more preferably 6 to 10 parts by mass, for 100 parts by mass of the acrylic rubber composition.

If the amount of the peroxide is loss than 5 parts by mass, the cross-linking may be insufficient, and mechanical characteristics such as tensile strength and elongation at break of the resulting cross-linked product may be lowered. If the amount is more than 10 parts by mass, the cross-linked product may be cured, losing the elasticity.

In the case that the acrylic rubber having the above structure is used, the cross-linking agent may not be used and instead an acid acceptor and a cross-linking accelerator may be used for cross-linking.

Examples of the acid acceptor include metal oxides and metal hydroxides. Examples of the metal oxide include magnesium oxide, zinc oxide, and calcium oxide. Examples of the metal hydroxide include magnesium hydroxide, zinc hydroxide, calcium hydroxide, and aluminum hydroxide.

The cross-linking accelerator may be a quaternary ammonium salt or a quaternary phosphonium salt. Examples of the quaternary ammonium salt include tetraethyl ammonium chloride, tetraethyl ammonium bromide, tetrabutyl ammonium chloride, tetrabutyl ammonium bromide, n-dodecyl trimethyl ammonium chloride, n-dodecyl trimethyl ammonium bromide, octadecyl trimethyl ammonium bromide, cetyl dimethyl ammonium chloride, 1,6-diaza-bicyclo (5.4.0)undec-7-ene-cetylpyridinium sulfate, and trimethyl benzyl ammonium benzoate. Examples of the quaternary phosphonium salt include triphenyl benzyl phosphonium chloride, triphenyl benzyl phosohonium bromide, tricyclohexyl benzyl phosphonium chloride, and tricyclohexyl benzyl phosphonium bromide.

(B) Fluororesin

The fluororesin (B) is a perfluororesin. When the fluororesin (B) is a perfluororesin, the resulting acrylic rubber molded product has good low-friction properties and good non-sticking properties.

The fluororesin (B) is, for example, a polymer containing a polymerized unit based on at least one fluorine-containing ethylenic monomer. The fluorine-containing ethylenic monomer is a perfluoromonomer.

The fluororesin (B) is preferably a melt-processable fluororesin. With the melt-processable fluororesin, the acrylic rubber molded product of the present invention can have better low-friction properties and better non-sticking properties. Moreover, an acrylic rubber molded product having protrusions on its surface can be obtained, as described below. This acrylic rubber molded product with protrusions has better low-friction properties and better non-sticking properties. In addition, the acrylic rubber (A) and the fluororesin (B) are more integrally formed, resulting in good durability.

The melt-processable fluororesin is preferably at least one selected from the group consisting of tetrafluoroethylene (TFE)/hexafluoropropylene (HFP) copolymers, TFE/HFP/perfluoro(alkyl vinyl ether) (PAVE) copolymers, and TFE/PAVE copolymers [PFA and MFA]. Low-molecular-weight polytetrafluoroethylene (PTFE) can be used as long as it is melt-processable.

The fluororesin (B) preferably has a melting point equal to or higher than the cross-linking temperature of the acrylic rubber (A). The melting point of the fluororesin (B) is equal to or higher than the cross-linking temperature of the acrylic rubber (A) and appropriately determined depending on the kind of the acrylic rubber (A). It is preferably 210° C. or lower, more preferably 200° C. or lower, and even more preferably 193° C. or lower. The lower limit is not particularly limited, but may be 150° C. or higher, for example.

If the melting point is too high, the molded product having a desired shape may not be formed in cross-linking and molding. In addition, in the case of forming the protrusions as described below on the surface of the acrylic rubber molded product, the acrylic rubber molded product may have an insufficient number of protrusions. If the melting point is too low, the fluororesin melts in cross-linking and molding, and as a result, the acrylic rubber molded product may have an insufficient number of protrusions.

The melting point of the fluororesin (B) herein is measured by a calorimetry in accordance with ASTM D-4591 with a differential scanning calorimeter at a temperature-increasing rate of 10° C./min. As the temperature once reached the point of (heat absorption completion temperature+30° C.), which corresponds to the melting peak, the temperature was lowered to 50° C. at a temperature-decreasing rate of −10° C./min, and then the temperature was re-increased to the point of (heat absorption completion temperature+30° C.) at a temperature-increasing rate of 10° C./min. The melting point is determined based on the peak of the heat-absorption curve thus obtained.

The fluororesin (B) preferably has a melt flow rate (MFR) at 280° C. of 0.3 to 200 g/10 min, and more preferably 1 to 100 g/10 min. If the MFR is too small, abrasion resistance may be poor. If the MFR is too large, molding may be difficult.

The MFR herein is determined by a measurement in accordance with ASTM D3307-01 at a temperature of 280° C. and a load of 5 kg.

The fluororesin (B) is preferably a copolymer (hereinafter, also referred to as "FEP") including a TFE unit (a) and a HFP unit (b) because such a copolymer provides an acrylic rubber molded product having better low-friction properties and better non-sticking properties. The FEP is preferred also because it allows the acrylic rubber molded product to have good heat resistance.

The FEP is a copolymer consisting only of a TFE unit (a) and a HFP unit (b) or a copolymer including a TFE unit (a), a HFP unit (b), and a polymerized unit based on a monomer copolymerizable with TFE and HFP.

If the FEP is a copolymer including a TFE unit (a), a HFP unit (b), and a polymerized unit based on a monomer copolymerizable with TFE and HFP, the monomer copolymerizable with TFE and HFP may be a perfluoro(alkyl vinyl ether) [PAVE] represented by the formula:

$$CF_2=CF-ORf^6$$

(wherein $Rf^6$ is a C1 to C5 perfluoroalkyl group), a vinyl monomer represented by the formula:

$$CF_2=CF(CF_2)_nF$$

(wherein n is an integer of 2 to 10), or the like monomer. Since the monomer copolymerizable with TFE and HFP is a perfluoromonomer, the resulting acrylic rubber molded product has better low-friction properties and better non-sticking properties. PAVE is preferred among perfluoromonomers.

The fluororesin (B) is preferably, for example, at least one copolymer selected from the group consisting of TFE/HFP copolymers and TFE/HFP/PAVE copolymers.

The PAVE is preferably at least one selected from the group consisting of perfluoro(methyl vinyl ether) [PMVE], perfluoro(ethyl vinyl ether) [PEVE], perfluoro(propyl vinyl ether) [PPVE], and perfluoro(butyl vinyl ether). More preferably, it is at least one selected from the group consisting of PMVE, PEVE, and PPVE.

For the resulting acrylic rubber molded product to have a smaller compression set, the fluororesin (B) is preferably at least one selected from the group consisting of the below-mentioned fluororesins (B1) and (B2) having a specific composition.

The fluororesins (B1) and (B2) are copolymers having a specific composition and including a tetrafluoroethylene unit and a hexafluoropropylene unit. By using the fluororesin (B1) or (B2) with a specific composition, low compression set of the molded product obtained from the acrylic rubber composition of the present invention can be improved without impairing low-friction properties and non-sticking properties of the surface of the molded product.

The fluororesin (B1) is a polymer consisting only of a tetrafluoroethylene (TFE) unit (a) and a hexafluoropropylene (HFP) unit (b) and is a copolymer having a molar ratio of TFE unit (a)/HFP unit (b) of (80.0 to 87.3)/(12.7 to 20.0). The fluororesin (B1) having the above specific composition can give low-friction properties and non-sticking properties to the resulting acrylic rubber molded product without deteriorating the compression set.

The fluororesin (B1) preferably has a molar ratio of (a)/(b) of (82.0 to 87.0)/(13.0 to 18.0), more preferably (83.0 to 86.5)/(13.5 to 17.0), and even more preferably (83.0 to 86.0)/(14.0 to 17.0) not to deteriorate the compression set of the acrylic rubber molded product and to provide good mechanical physical properties. If the ratio of (a)/(b) is too large, the compression set of the resulting acrylic rubber molded product may be impaired. If the ratio of (a)/(b) is too small, the mechanical physical properties tend to be lowered.

The fluororesin (B2) is a copolymer that includes a TFE unit (a), a HFP unit (b), and a polymerized unit (c) based on a monomer copolymerizable with TFE and HFP and has a molar ratio of (a)/(b) of (80.0 to 90.0)/(10.0 to 20.0) and a molar ratio of (c)/[(a)+(b)] of (0.1 to 10.0)/(90.0 to 99.9). ([(a)+(b)] herein means the total of the TFE unit (a) and the HFP unit (b).) If the molar ratio of (a)/(b) is (80.0 to 90.0)/(10.0 to 20.0) and the molar ratio of (c)/[(a)+(b)] is (0.1 to 10.0)/(90.0 to 99.9), the fluororesin (B2) can give low-friction properties and non-sticking properties to the resulting acrylic rubber molded product without deteriorating the compression set.

The fluororesin (B2) preferably has a molar ratio of (a)/(b) of (82.0 to 88.0)/(12.0 to 18.0) to further lower the compression set and to provide good mechanical physical properties.

The fluororesin (B2) preferably has a molar ratio of (c)/[(a)+(b)] of (0.3 to 8.0)/(92.0 to 99.7).

The monomer copolymerizable with TFE and HFP is the same as described above.

In the fluororesin (B2), the polymerized unit (c) based on a monomer copolymerizable with TFE and HFP is preferably a PAVE unit. The fluororesin (B2) is preferably a copolymer consisting only of a TFE unit, a HFP unit, and a PAVE unit.

The fluororesins (B1) and (B2) each preferably have a melting point of 210° C. or lower, more preferably 200° C. or lower, and even more preferably 190° C. or lower. The lower limit thereof is not particularly limited, but may be 150° C. or higher, for example.

(Acrylic Rubber Composition)

The acrylic rubber composition of the present invention preferably has a ratio of the acrylic rubber (A) to the fluororesin (B) (acrylic rubber (A)/fluororesin (B)) of 97/3 to 55/45 (v/v). If the ratio of the fluororesin (B) is too small, the resulting acrylic rubber molded product may be insufficient in low-friction properties and non-sticking properties. If the ratio of the acrylic rubber (A) is too small, the flexibility may be impaired. The ratio of (A)/(B) is preferably 95/5 to 60/40 (v/v), and more preferably 90/10 to 65/35 (v/v) because with the ratio in this range, the molded product produced from the acrylic rubber composition can have both good flexibility, and low-friction properties and non-sticking properties on its surface.

The acrylic rubber composition of the present invention contains the acrylic rubber (A) and the fluororesin (B) and optionally a cross-linking agent, a cross-linking accelerator, an acid acceptor, and the like, and may further contain at least one multifunctional compound to improve compatibility. The multifunctional compound herein refers to a compound containing two or more functional groups having the same or different structures in one molecule.

The acrylic rubber composition of the present invention may further contain at least one multifunctional compound to improve the compatibility of the fluororesin (B) and the acrylic rubber (A). The multifunctional compound herein refers to a compound containing two or more functional groups having the same or different structures in one molecule.

The functional group in the multifunctional compound may be any functional group generally known to have reactivity. Examples thereof include carbonyl, carboxy, haloformyl, amide, olefin, amino, isocianate, hydroxy, and epoxy groups. The compounds having these functional groups are not only highly compatible with the acrylic rubber (A) but also expected to react with the functional group in the fluororesin (B) known to have reactivity, thereby further improving the compatibility.

The acrylic rubber composition of the present invention may further contain sub materials which are added to usual rubber compounded products.

The sub materials include various additives such as antioxidants (e.g., diphenylamine derivatives, phenylenediamine derivatives), processing aids (e.g., stearic acid), fillers (e.g., carbon black, kaolin clay, talc, diatomite), plasticizers, colorants, stabilizers, adhesive aids, mold-release agents, electrical conductivity imparting agents, thermal conductivity imparting agents, anti-tackifiers for surfaces, flexibility imparting agents, thermal resistance improvers, and flame retardants. The sub materials are used in a range that does not impair the effect of the present invention.

The acrylic rubber composition of the present invention can be obtained by, for example, kneading the acrylic rubber (A) and the fluororesin (B) and optionally a cross-linking agent, a cross-linking accelerator, an acid acceptor, a sub material and the like with an open mill roll, an internal mixer or the like typically used in the rubber industry. By such a method, an acrylic rubber composition in the form of pellets or the like can be obtained. In the case of the co-coagulated composition obtainable by co-coagulating the acrylic rubber (A) and the fluororesin (B), the acrylic rubber (A) and the fluororesin (B) may be co-coagulated to provide a co-coagulated composition, and thereafter the co-coagulated composition, the acid acceptor, cross-linking accelerator, sub material, and the like are kneaded.

The acrylic rubber molded product of the present invention is obtainable by cross-linking the acrylic rubber composition containing the acrylic rubber (A) and the fluororesin (B). The acrylic rubber molded product of the present invention is not particularly limited as long as it is obtainable by cross-linking the acrylic rubber composition containing the acrylic rubber (A) and the fluororesin (B), but is preferably obtainable by the production method described below.

For example, the acrylic rubber molded product can have good low-friction properties and good non-sticking properties on its surface if the acrylic rubber molded product is obtained by cross-linking the acrylic rubber composition including the co-coagulated composition obtained by co-coagulating the acrylic rubber (A) and the fluororesin (B) and further heating the cross-linked product under specific conditions.

Since obtained from the acrylic rubber composition, the acrylic rubber molded product of the present invention has good low-friction properties and good non-sticking properties, and also good flexibility.

The acrylic rubber molded product of the present invention preferably has protrusions on the surface thereof. If the protrusions are present on the surface of the acrylic rubber molded product, the product exhibits good low-friction properties and good non-sticking properties. It also has good abrasion resistance.

The protrusions preferably substantially consist of the fluororesin (B) in the acrylic rubber composition. The protrusions can be formed by, for example, allowing the fluororesin (B) in the acrylic rubber composition to precipitate on the surface by the following method.

The fact that the protrusions substantially consist of the fluororesin (B) in the acrylic rubber composition can be shown by determining the peak ratio between the peak due to the acrylic rubber (A) and the peak due to the fluororesin (B) by IR analysis or ESCA. Specifically, in a region with protrusions, the ratio (ratio between peaks due to the components) between the peak of characteristic absorption due to the fluororubber (A) and the peak of characteristic absorption due to the fluororesin (B) is determined by IR analysis at the portion with protrusions and the portion without protrusions, and the value ((peak with protrusions)/(peak without protrusions)=ratio between peaks) is at least 1.2 or higher, and preferably 1.5 or higher.

The shapes of the protrusions will be described in detail below referring to the drawings.

FIG. 1(a) is a perspective view schematically showing the shapes of protrusions of the acrylic rubber molded product; FIG. 1(b) is a cross-sectional view of protrusions 31 along the plane including the straight lines $B_1$ and $B_2$ perpendicular to the surface shown in FIG. 1(a); and FIG. 1(c) is a cross-sectional view along the plane including the straight lines $C_1$ and $C_2$ parallel with the surface shown in FIG. 1(a). FIGS. 1(a) to 1(c) schematically illustrate a very small region on the surface of the acrylic rubber molded product. As shown in FIGS. 1(a) to 1(c), the surface of the acrylic rubber molded product has protrusions 31 formed thereon having, for example, a substantially conical shape.

The height of each protrusion 31 herein means the height of a portion projected from the surface of the acrylic rubber molded product (see the symbol H in FIG. 1(b)). The bottom cross-sectional area of each protrusion 31 means the area of the cross section of the protrusion 31 which is formed by cutting the protrusion 31 on the plane (the plane including the straight lines $C_1$ and $C_2$) parallel with the surface of the acrylic rubber molded product (see FIG. 1(c)).

The area ratio of regions having protrusions to the surface of the acrylic rubber formed product is preferably 0.03 (3%) or higher. The area ratio is more preferably 0.04 (4%) or higher, even more preferably 0.15 (15%) or higher, and particularly preferably 0.30 (30%) or higher. The area ratio of regions having protrusions to the surface of the acrylic rubber molded product means the ratio of the area occupied by the protrusions on the cross section for evaluating the bottom cross-sectional area of the protrusions.

The volume ratio of the fluororesin (B) to the acrylic rubber molded product of the present invention is preferably 0.03 to 0.45 (3 to 45% by volume). The lower limit of the volume ratio is more preferably 0.05 (5% by volume), and even more preferably 0.10 (10% by volume). The upper limit of the volume ratio is more preferably 0.40 (40% by volume), and even more preferably 0.35 (35% by volume).

The fluororesin (B) has good heat resistance and thereby is not decomposed during cross-linking or heating step. Thus, the above volume ratio is presumably equal to that of the fluororesin (B) in the acrylic rubber composition.

The acrylic rubber molded product of the present invention preferably satisfies that the area ratio of regions having protrusions to the surface of the acrylic rubber molded product is at least 1.1 times, and more preferably at least 1.2 times the volume ratio of the fluororesin (B) to the acrylic rubber molded product. In the acrylic rubber molded product of the present invention, the area ratio of regions having protrusions to the surface of the acrylic rubber molded product is higher than the volume ratio of the fluororesin (B) to the acrylic rubber molded product than the volume ratio of the fluororesin (B) to the acrylic rubber composition.

Even though the ratio of the fluororesin is low, due to this characteristic, the acrylic rubber molded product of the present invention is improved in low-friction properties and non-sticking properties, which have been lacking in acrylic rubber, without losing advantages of the acrylic rubber. Also, the molded product can have good abrasion resistance and a small compression set. When the above area ratio of regions having protrusions is achieved at least in the portion requiring low-friction properties, abrasion resistance, or non-sticking properties, depending on the application of the acrylic rubber molded product, the effects of the present invention can be sufficiently exerted.

The protrusions preferably have a height of 0.1 to 30.0 μm. If the protrusions have a height within this range, good low-friction properties, good abrasion resistance, and good non-sticking properties are provided. The protrusions more preferably have a height of 0.3 to 20.0 μm, even more preferably 0.4 to 15.0 μm, and particularly preferably 0.5 to 15.0 μm.

The protrusions preferably have a bottom cross-sectional area of 0.1 to 2,000 μm². If the protrusions have a bottom cross-sectional area within in this range, good abrasion resistance, good low-friction properties, and good non-sticking properties are provided. The protrusions more preferably have a bottom cross-sectional area of 0.3 to 1,500 μm², and even more preferably 0.5 to 1,000 μm².

In the acrylic rubber molded product of the present invention, the standard deviation of the height of the protrusions is 0.300 or less. Protrusions having a standard deviation within this range can provide better abrasion resistance, better low-friction properties, and better non-sticking properties.

The acrylic rubber molded product preferably has 500 to 60,000 protrusions per mm². If the number of protrusions is within this range, abrasion resistance, low-friction properties, and non-sticking properties are better.

The area ratio of the region having protrusions, the heights of protrusions, the bottom cross-sectional areas of protrusions, the number of protrusions, and the like can be calculated with a color 3D laser microscope (VK-9700, Keyence Corp.) and WinRooF Ver.6.4.0 (MITANI Corp.) as an analysis software. The area ratio of the region having protrusions can be determined by determining the bottom cross-sectional area of each protrusion and calculating the sum of the cross-sectional areas as the proportion in the whole area measured. The number of protrusions is the number of protrusions in a measurement field in terms of the number per mm².

In the acrylic rubber molded product of the present invention, the protrusions are formed at least part of the surface of the acrylic rubber molded product. The surface of the acrylic rubber molded product may have a region without any protrusion. Specifically, the protrusions need not be formed in the region that does not require low-friction properties, non-sticking properties, or the like properties.

The acrylic rubber molded product of the present invention is useful as sealing materials, packing materials, O-ring materials, and the like because of the low-friction properties and non-sticking properties on its surface.

Specific applications of the acrylic rubber molded product of the present invention include, but not limited to, the following molded products.

Sealing Materials:

In the fields relating to semiconductor production such as semiconductor producing devices, liquid crystal panel producing devices, plasma panel producing devices, plasma-addressed liquid crystal panels, field emission display panels, and solar battery substrates, examples of the sealing material include O (square)-rings, packings, gaskets, diaphragms, and other various sealing materials. These sealing materials can be used for CVD devices, dry etching devices, wet etching devices, oxidation diffusion devices, sputtering devices, ashing devices, washing devices, ion implanting devices, and gas discharging devices. Specific examples of the sealing material include O-rings for gate valves, O-rings for quartz windows, O-rings for chambers, O-rings for gates, O-rings for bell jars, O-rings for couplings, O-rings and diaphragms for pumps, O-rings for semiconductor gas control devices, O-rings for resist developers and peeling liquids, and other various sealing materials.

In the field of automobiles, the acrylic rubber molded products can be used as sealing materials such as gaskets, shaft seals, valve stem seals, or other various sealing materials for engines and the peripheral devices thereof, or various sealing materials for automatic transmissions. Examples of the sealing material for fuel systems and the peripheral devices thereof include O (square)-rings, packings, and diaphragms. Specific examples thereof include engine head gaskets, metal gaskets, oil pan gaskets, crankshaft seals, cam shaft seals, valve stem seals, manifold packings, seals for oxygen sensors, injector O-rings, injector packings, fuel pump O-rings, diaphragms, crankshaft seals, gear box seals, power piston packings, cylinder liner seals, valve stem seals, automatic transmission front pump seals, rear axle pinion seals, universal joint gaskets, speed meter pinion seals, foot brake piston cups, torque transmission O-rings, oil seals, exhaust gas recirculation system seals, bearing seals, and carburetor sensor diaphragms.

In the airplane, rocket and shipbuilding fields, examples of the sealing material include diaphragms, O (square)-rings, valves, packings, and other various sealing materials, and these can be used in fuel systems. Specifically, in the airplane field, the molded products are used as jet engine valve stem seals, gaskets and O-rings, rotating shaft seals, hydraulic gaskets and fire wall seals and the like; in the shipbuilding field, the molded products are used as screw propeller shaft stern seals, diesel engine suction and exhaust valve stem seals, butterfly valve seals, butterfly valve shaft seals and the like.

Examples of the sealing materials in the chemical plant field include valves, packings, diaphragms, O (square)-rings, and other various sealing materials, and these can be used in various steps of producing chemicals such as medicinal chemicals, agrochemicals, paints and resins. More specifically, the molded products can be used as seals in chemical pumps, flowmeters and piping systems, heat exchanger seals, glass cooler packings in sulfuric acid production plants, seals in agrochemical spreaders and agrochemical transfer pumps, gas piping seals, plating bath seals, high-temperature vacuum drier packings, papermaking belt roller seals, fuel cell seals, wind tunnel joint seals, tube joining part packings in gas chromatographs and pH meters, and seals, diaphragms and valve parts in analytical apparatus and physical and chemical apparatus.

In the photographic field (e.g., developing machines), the printing field (e.g., printing machines) and the painting field (e.g., painting equipment), the molded products can be used for example as seals and valve parts in dry-process copying machines.

Also, the molded products can be used for rolls and belts for the above fields.

In the food industry plant equipment field, examples of the sealing material include valves, packings, diaphragms, O (square)-rings and various sealing materials, and these can be used in food production steps. More specifically, the molded products can be used as plate type heat exchanger seals, and vending machine electromagnetic valve seals.

In the nuclear power plant equipment field, examples of the scaling material include packings, O-rings, diaphragms, valves, and various seal members.

In the general industry field, examples of the sealing material include packings, O-rings, diaphragms, valves, and various seal members. More specifically, the molded products are used as seals and bearing seals in hydraulic and lubricating systems, windows and other seals in dry cleaning equipment, uranium hexafluoride enrichment apparatus seals, seal (vacuum) valves in cyclotrons, automatic packaging machine seals, diaphragms in pumps (in pollution-monitoring apparatus) for analyzing sulfurous acid gas and chlorine gas in air, and the like.

In the electric system field, the molded products are specifically used as bullet train (Shinkansen) insulating oil caps, liquid-sealed transformer benching seals and the like.

In the fuel cell field, the molded products are specifically used as seal materials between electrodes or between electrodes and a separator and as seals (packings) in hydrogen, oxygen or product water piping systems.

In the electronic component field, the molded products are specifically used as radiator materials, electromagnetic wave shield materials, computer hard disk drive gaskets and the like.

Those sealing materials which can be used in situ molding are not particularly limited, and examples thereof include engine oil pan gaskets, gaskets for magnetic recording apparatus, and clean room filter unit sealing materials.

The molded products can be particularly suitably used as gaskets for magnetic recording apparatus (hard disk drives) and scaling materials for clean equipment such as sealing materials in semiconductor manufacturing apparatus or storehouses for wafers or other devices.

Sliding Members:

In the automobile-related fields, examples of the sliding members include piston rings, shaft seals, valve stem seals, crankshaft seals, cam shaft seals, oil seals, and transmission seals.

Generally, the examples include acrylic rubber products used as parts that slide in contact with other materials.

Non-Adhesive Members:

Examples of the non-adhesive member in the computer field include hard disk crash stoppers.

Examples thereof in office automation equipment field include fixing rolls and belts.

Fields Utilizing Water Repellency and Oil Repellency:

Examples of the application include automobile wiper blades and coated fabrics for outdoor tents.

Medical Field:

Examples of the application include gaskets for syringes.

In the following, the method of producing the acrylic rubber molded product of the present invention will be described. The acrylic rubber molded product produced by the method of producing the acrylic rubber molded product of the present invention has better low-friction properties and better non-sticking properties.

The method of producing the acrylic rubber molded product of the present invention includes: (I) co-coagulating the acrylic rubber (A) and the fluororesin (B) to provide a co-coagulated composition and then producing the acrylic rubber composition; (II) molding and cross-linking the acrylic rubber composition to provide a cross-linked molded product; and (III) heating the cross-linked molded product to a temperature equal to or higher than the melting point of the fluororesin (B) to provide an acrylic rubber molded product.

The steps are explained below.

Step (I)

In this step, the acrylic rubber (A) and the fluororesin (B) are co-coagulated to provide a co-coagulated composition, and thereafter the acrylic rubber composition is obtained.

The co-coagulation may be carried out by, for example, (i) mixing an aqueous dispersion of the acrylic rubber (A) and an aqueous dispersion of the fluororesin (B) and then coagulating the mixture; (ii) adding powder of the acrylic rubber (A) to the fluororesin (B) and then coagulating the mixture; (iii) adding powder of the fluororesin (B) to an aqueous dispersion of the acrylic rubber (A) and then coagulating the resulting mixture, or other methods.

The co-coagulation is preferably carried out by the method (i) because this method allows the resins to be easily uniformly dispersed.

In the coagulation in the methods (i) to (iii), a coagulant can be used, for example. The coagulant is not particularly limited. Examples thereof include known coagulants including aluminum salts such as aluminum sulfate and alum, calcium salts such as calcium sulfate, magnesium salts such as magnesium sulfate and magnesium chloride, and monovalent cation salts such as sodium chloride and potassium chloride. In coagulation with a coagulant, acid or alkali may be added to control pH to promote the coagulation.

Since some cross-linking systems of acrylic rubber require a cross-linking agent, it is also preferable that the step (I) is a step of co-coagulating the acrylic rubber (A, and the fluororesin (B) to provide a co-coagulated composition and then mixing the co-coagulated composition and a cross-linking agent to provide an acrylic rubber composition.

Mixing of the co-coagulated composition and the cross-linking agent can be performed by any of conventionally known methods. For example, the co-coagulated composition and the cross-linking agent are mixed using an open roll mill for a period of time and temperature enough to sufficiently mix them.

In addition to the cross-linking agent, the acid acceptor, cross-linking accelerator, sub materials and the like can be added.

(II) Molding and Cross-Linking

In this step, the acrylic rubber composition obtained in the step (I) is molded and crosslinked to provide a cross-linked molded product. The order of molding and cross-linking is not limited. It may be possible to perform molding first and then perform cross-linking, or first cross-linking and then molding. It may also be possible to simultaneously perform molding and cross-linking.

For hoses, elongated plates, or the like, it is suitable to carry out extrusion-molding first and then cross-linking. For irregular-shaped molded products, a block-shaped cross-linked product may be first prepared and then it is shaped by cutting or other treatments. For relatively simple molded products, such as piston rings and oil seals, molding and cross-linking are typically performed at the same time.

Examples of the molding methods include, but not limited to, an extrusion molding method, a pressure molding method using a metal mold, and an injection molding method.

The cross-linking may be performed by, for example, steam cross-linking, pressure-molding, radiation cross-linking, a usual method of starting cross-linking by heating, or the like. Preferred in the present invention is cross-linking by heating because it allows the fluororesin (B) to smoothly form protrusions on the surface of the acrylic rubber molded product.

The cross-linking temperature is preferably equal to or higher than the cross-linking temperature of the acrylic rubber (A) but lower than the melting point of the fluororesin (B). Crosslinking performed at a temperature equal to or higher than the melting point of the fluororesin (B) may decrease mold-releasability and thereby fail to provide sufficient non-sticking properties and low-friction properties. Moreover, the resulting acrylic rubber molded product may have insufficient number of protrusions.

The cross-linking temperature is more preferably lower than a temperature 5° C. lower than the melting point of the fluororesin (B) and equal to or higher than the cross-linking temperature of the fluororubber (A). The cross-linking time is, for example, 1 minute to 24 hours, and appropriately determined based on factors such as the kind of the cross-linking agent.

The methods and conditions for molding and cross-linking the acrylic rubber composition may be within the range of methods and conditions known in the molding and cross-linking employed.

Non-limitative specific cross-linking conditions include a typical temperature range from 150° C. to 180° C. and a time range from 1 minute to 24 hours. These conditions may be appropriately determined based on factors such as the kind of the cross-linking agent.

In some cases, a post-treatment called secondary cross-linking is performed after the first cross-linking (primary cross-linking) in the cross-linking of rubber. As will be mentioned in the following section of "(III) Heating", a conventional secondary cross-linking is a different treatment from the molding and cross-linking (II) and the heating (III) of the present invention.

(III) Heating

In this step, the cross-linked molded product obtained in the molding and cross-linking step (II) is heated to a temperature equal to or higher than the melting point of the fluororesin (B) to provide an acrylic rubber molded product.

The heating step (III) of the present invention is intended to increase the ratio of fluororesin on the surface of the cross-linked molded product. To achieve this purpose, the heating temperature is equal to or higher than the melting point of the fluororesin (B) but lower than the thermal decomposition temperatures of the acrylic rubber (A) and the fluororesin (B).

If the heating temperature is lower than the melting point of the fluororesin (B), the protrusions of the fluororesin (B) are not sufficiently formed on the surface of the cross-linked molded product. The heating temperature needs to be lower than the lower one of the thermal decomposition temperatures of the acrylic rubber (A) and the fluororesin (B) to avoid thermal decomposition of the acrylic rubber (A) and the fluororesin (B). A preferable heating temperature is a temperature at least 5° C. higher than the melting point of the fluororesin (B) because such a temperature easily improves low friction properties in a short time.

In the heating step (III), the heating temperature closely correlates with the heating time. If the heating temperature is relatively close to the lower limit, the heating time is preferably relatively long. If the heating temperature is relatively close to the upper limit, the heating time is preferably relatively short.

The conventional secondary cross-linking is a treatment for completely decomposing the cross-linking agent remaining after the primary cross-linking, thereby completing the cross-linking of fluororubber and improving the mechanical properties and the compression set of the molded, cross-linked product.

Thus, although the conventional secondary cross-linking conditions, which do not suppose the existence of the fluororesin (B), coincidentally overlap with the heating conditions for the heating step of the present invention, the heating conditions of the secondary-cross-linking are selected only to complete the cross-linking of the acrylic rubber (completely decompose the cross-linking agent) without considering the existence of the fluororesin. Therefore, the conditions for heat-softening or melting the fluororesin (B) mixed in a rubber cross-linked product (not a rubber un-cross-linked product) cannot be derived from the conditions for the secondary cross-linking.

Here, in the molding and cross-linking step (II), the secondary cross-linking may be carried out to complete the cross-linking of the acrylic rubber (A) (to completely decompose the cross-linking agent).

In the heating step (III), the remaining cross-linking agent may be decomposed, thus completing the cross-linking of the acrylic rubber (A). However, the cross-linking of the acrylic rubber (A) in the heating step (III) is just a side effect.

With the production method of the present invention, the obtained acrylic rubber molded product can be significantly improved in fluororesin characteristics such as low-friction properties, non-sticking properties, water repellency, and oil repellency, as compared with non-heat-treated products. Moreover, in regions other than the surface, characteristics of the acrylic rubber are exhibited. As a result, the acrylic rubber molded product as a whole can be good in low compression set, low-friction properties, non-sticking properties, water repellency, and oil repellency in a balanced manner.

Further, the obtained acrylic rubber molded product has no clear interface between the fluororesin and the acrylic rubber, preventing the surface region rich in fluororesin from falling or peeling. As a result the molded product has good durability as compared with the case where the acrylic rubber surface is modified by applying or bonding fluororesin.

EXAMPLES

In the following, the present invention will be described with reference to examples. The examples are not intended to limit the scope of the invention.

The characteristics in the present description were measured by the following methods.

(1) Monomer Composition of Fluororesin

The monomer composition was determined by a $^{19}$F-NMR measurement with a nuclear magnetic resonance apparatus AC300 (Bruker-Biospin) at a temperature of (melting point of the polymer+50° C.).

(2) Melting Point of Fluororesin

The calorimetry was performed using a differential scanning calorimeter RDC220 (Seiko Instruments Inc.) in accordance with ASTM D-4591 at a temperature-increasing rate of 10° C./min. As the temperature once reached the point of (heat absorption completion temperature+30° C.), which corresponds to the melting peak, the temperature was lowered to 50° C. at a temperature-decreasing rate of −10° C./min, and then the temperature was re-increased to the point of (heat absorption completion temperature+30° C.) at a temperature-increasing rate of 10° C./min. The melting point was determined based on the peak of the heat-absorption curve obtained.

(3) Melt Flow Rate (MFR) of Fluororesin

The MFR was determined as follows. A polymer was ejected from a nozzle having an inner diameter of 2 mm and a length of 8 mm for 10 minutes at a temperature of 280° C. and a load of 5 kg using a melt indexer (Toyo Seiki Seisaku-sho, Ltd.) in accordance with ASTM D3307-01. The amount (g/10 min) of the polymer ejected was defined as the MFR.

(4) Storage Elastic Modulus (E') of Fluororesin

The storage elastic modulus is a value determined by dynamic viscoelasticity measurement at 70° C. on a sample having a length of 30 mm, a width of 5 mm, and a thickness of 0.25 mm using a dynamic viscoelasticity analyzer DVA220 (IT KEISOKU SEIGYO K.K.) in a tensile mode at a grip width of 20 mm, a measurement temperature of from 25° C. to 200° C., a temperature-increasing rate of 2° C./min, and a frequency of 1 Hz.

(5) Measurement of Thermal Decomposition Onset Temperature (1% Mass Loss Temperature)

The thermal decomposition onset temperature was defined as a temperature at which the fluororesin under a heating test using a thermogravimetric/differential thermal analysis (TG-DTA) device loses 1% of the mass by decomposition.

(6) 100% Modulus (M100)

This value was measured in accordance with JIS K6251.

(7) Tensile Strength at Break (Tb)

This value was measured in accordance with JIS K6251.

(8) Tensile Elongation at Break (Eb)

This value was measured in accordance with JIS K6251.

(9) Hardness (Shore A)

This value (peak value) was measured in accordance with JIS K6253 with a durometer type A.

(10) Dynamic Friction Coefficient

A measurement was performed with a friction player FPR-2100 (Rhesca Corp.) at a load of 20 g (pin diameter φ: 5 mm, pin material: SUJ2) in a rotation mode at a rotation rate of 120 rpm and a rotation radius of 10 mm. At least 5 minutes after the rotation, the friction coefficient in a stable state was read and defined as the dynamic friction coefficient.

(11) Non-Sticking Properties (Tackiness)

A tacking tester (TAC-II, Rhesca Corp.) was used. A measurement probe (cylinder-shaped, φ5.0 mm, SUS304) was pressed against a molded sheet (test molded product) having a surface temperature of 40° C. and then withdrawn. The tackiness in this process was measured. The probe were controlled under the conditions as follows:

approaching speed: 120 mm/min pressure: 500 gf pressurizing time: 30 s withdrawing speed: 600 mm/min.

(12) Area Ratio of Region Having Protrusions, Height of Protrusions, Bottom Cross-Sectional Area of Protrusions, and Number of Protrusions The area ratio of the region having protrusions, the heights of protrusions, the bottom cross-sectional areas of protrusions, the number of protrusions, and the like were calculated using a color 3D laser microscope (VK-9700, Keyence Corp.) and WinRooF Ver. 6.4.0 (MITANI CORP.) as an analysis software. The area ratio of the region having protrusions was determined as the ratio of the sum of the bottom cross-sectional areas of the protrusions to the whole area measured. The number of protrusions was the number of protrusions within the measurement area in terms of the number per mm$^2$.

The materials in Table and DESCRIPTION are listed below.

Stearic acid

Paraffin wax

NAUGARD #445 (Uniroyal Chemical)

Filler:

SEAST V (Tokal Carbon Co., Ltd.)

Cross-linking agent:

CHEMINOX AC-6 (Unimatec Co., Ltd.)

Cross-linking accelerator:

NOCCELER DT (Ouchi Shinko Chemical Industrial Co., Ltd.)

Acrylic rubber emulsion (A1)

XF-5140 (Tohpe Corp.) emulsion (concentration: 31.1 wt %)

Acrylic rubber (A2)

XF-5140 (Tohpe Corp.) base polymer

Synthesis Example 1

Preparation of Aqueous Dispersion (B1) of FEP

A stainless-steel autoclave (internal capacity: 3 L) equipped with a stirrer was charged with deionized water (1767 g), a 50% aqueous solution of $CH_2$=$CFCF_2$—O—$(CF(CF_3)CF_2O)$—$CF(CF_3)$—$COONH_4$ (0.283 g (an amount corresponding to 80 ppm of the deionized water)) as a fluorine-containing allyl ether compound, and a 50% aqueous solution of $F(CF_2)_5COONH_4$ (3.53 g (an amount corresponding to 1000 ppm of the deionized water)) as a fluorine-containing anionic surfactant. A vacuum was drawn on the autoclave. The autoclave was then purged with nitrogen. Thereafter, hexafluoropropylene (HFP) was fed to achieve 3.4 MPa, and the temperature was heated to 95° C. Subsequently, HFP and TFE were fed to increase the pressure to 4.0 MPa, followed by pressing a 3.0 mass % aqueous solution of ammonium persulphate (16 g) as a polymerization initiator to initiate polymerization. The pressure started to decrease at 5 minutes from the pressing of the polymerization initiator. A mixed gas of TFE/HFP=70/30 (molar ratio) was injected to maintain the pressure in the polymerization tank, allowing the polymerization to continue. In addition, the 3.0 mass % aqueous solution of ammonium persulphate was constantly pressed from the initiation of the polymerization to maintain polymerization rate. The aqueous solution was added before the completion of the polymerization amounted to 35 g. Four hours after the initiation of the polymerization, the stirring was stopped and monomer gas was emitted, thereby terminating the reaction. Thereafter, the resulting product was cooled to a room temperature to provide a white TFE/HFP copolymer [FEP] dispersion (emulsion) (B1) (1990 g). A part of the obtained dispersion was dried, and the solid concentration thereof was measured and found to be 20.0%.

The obtained dispersion (300 g) was diluted two-fold, and aluminum sulfate was added thereto to perform coagulation. The resulting slurry was then filtered and the recovered slurry was mixed with ion-exchanged water (1 L) to be re-dispersed. The slurry was filtered again and washed. This washing step was repeated additional three times. The washed slurry was then dried at 110° C. to provide a polymer (58 g).

The obtained polymer had the following composition and physical properties.
TFE/HFP=83.2/16.8 (molar ratio)
Melting point: 179° C.
MFR: 8.5 g/10 min (280° C., 5 kg)
Storage elastic modulus at 70° C. (E'): 58 MPa
Thermal decomposition onset temperature (1% mass loss temperature): 375° C.

Synthesis Example 2

Preparation of Aqueous Dispersion (B2) of FEP

A stainless-steel autoclave (internal capacity: 3 L) equipped with a stirrer was charged with deionized water (1767 g), a 50% aqueous solution of $CH_2$=$CFCF_2$—O—$(CF(CF_3)CF_2O)$—$CF(CF_3)$—$COONH_4$ (0.283 g (an amount corresponding to 80 ppm of the deionized water)) as a fluorine-containing allyl ether compound, and a 50% aqueous solution of $F(CF_2)_5COONH_4$ (3.53 g (an amount corresponding to 1000 ppm of the deionized water)) as a fluorine-containing anionic surfactant. A vacuum was drawn on the autoclave. The autoclave was then purged with nitrogen. Thereafter, hexafluoropropylene (HFP) was introduced to achieve 3.4 MPa, and perfluoro(propyl vinyl ether) [PPVE] (17 g) was pressed. The temperature was raised to 95° C. Subsequently, HFP and TFE were introduced until the pressure reached 4.0 MPa, followed by pressing a 3.0 mass % aqueous solution of ammonium persulphate (16 g) as a polymerization initiator to initiate polymerization. The pressure started to decrease at 5 minutes from the injection of the polymerization initiator. A mixed gas of TFE/HFP=70/30 (molar ratio) was injected to maintain the pressure in the polymerization tank, allowing the polymerization to continue. In addition, the 3.0 mass % aqueous solution of ammonium persulphate was constantly pressed from the initiation of the polymerization to maintain polymerization rate. The aqueous solution was added before the completion of the polymerization amounted to 35 g. Four hours after the initiation of the polymerization, the stirring was stopped and monomer gas was emitted, thereby terminating the reaction. Thereafter, the resulting product was cooled to a room temperature to provide a white TFE/HFP/PPVE copolymer (FEP) dispersion (emulsion) (B2) (2000 g).

A part of the obtained dispersion was dried, and the solid concentration thereof was measured and found to be 20.3%.

The obtained dispersion (300 g) was diluted two-fold, and aluminum sulfate was added thereto to perform coagulation. The resulting slurry was then filtered and the recovered slurry was mixed with ion-exchanged water (1 L) to be re-dispersed. The slurry was filtered off again and washed. This washing step was repeated additional three times. The washed slurry was then dried at 110° C. to provide a polymer (56 g).

The obtained polymer had the following composition and physical properties.
TFE/HFP/PPVE=84.2/14.8/1.0 (molar ratio)
Melting point: 178° C.
MFR: 9.2 g/10 min (280° C., 5 kg)
Storage elastic modulus at 70° C. (E'): 63 MPa
Thermal decomposition onset temperature (1% mass loss temperature): 372° C.

Example 1

The FEP aqueous dispersion (B1) and the fluororubber dispersion (A1) were preliminary mixed into a solution with a volume ratio (fluororubber solids content/FEP solids content, of 75/25. A 400 cc portion of this solution was added to a preliminary prepared solution of 4 g of magnesium chloride in 500 cc of water in a 1-L mixer and mixed therein for 3 minutes to cause co-coagulation.

After the co-coagulation, the solids were collected and dried at 80° C.×48 hours in a drying furnace. The dried product was mixed with the predetermined materials shown in Table 1 with an open roll mill. Thereby, a cross-linkable composition was obtained.

The composition was molded in a metal mold and cross-linked at 160° C. for 30 minutes under a pressure of 40 kg/cm² to provide a primary cross-linked molded product.

The obtained primary cross-linked product was placed in a heating oven maintained at 190° C. for 24 hours, thereby providing a test molded product, which had protrusions shown in Table 1.

Example 2

A test molded product was obtained in the same manner as in Example 1 except that the aqueous dispersion of FEP (B2) was used instead of the aqueous dispersion (B1).

Comparative Example 1

The acrylic rubber (A2) was mixed with the predetermined materials shown in Table 1 with an open roll mill to provide a cross-linkable composition. Thereafter, a test product was obtained in the same manner as in Example 1.

TABLE 1

|  | Example 1 | Example 2 | Comparative Example 1 |
|---|---|---|---|
| Acrylic rubber (parts by mass) |  |  | 100 |
| Acrylic rubber and fluororesin (parts by mass) | 100 | 100 |  |
| Stearic acid (parts by mass) | 1.5 | 1.5 | 2 |
| Paraffin wax (parts by mass) | 1.5 | 1.5 | 2 |
| NAUGARD #445 (parts by mass) | 1.5 | 1.5 | 2 |
| SEAST V (parts by mass) | 37.5 | 37.5 | 50 |
| CHEMINOX AC-6 (parts by mass) | 0.75 | 0.75 | 1 |
| NOCCELER DT (parts by mass) | 0.75 | 0.75 | 1 |
| Normal Physical properties  M100 (MPa) | 3.9 | 4.1 | 2.6 |
| Tb (MPa) | 9 | 9.3 | 9.5 |
| Eb (%) | 241 | 252 | 235 |
| Shore A | 78.2 | 79.1 | 53.7 |
| Dynamic friction coefficient | 0.75 | 0.8 | 3.51 |
| Area ratio of regions having protrusions [%] | 36.5 | 33.8 | 0 |
| Height of protrusions [μm] | 0.43 to 1.88 | 0.41 to 1.66 | 0 |
| Cross-sectional area of protrusions [μm$^2$] | 3.8 to 198.2 | 2.3 to 180.1 | 0 |
| Number of protrusions [/mm$^2$] | 8293 | 8150 | 0 |

INDUSTRIAL APPLICABILITY

The acrylic rubber molded product of the present invention can be suitably used in applications requiring low-friction properties and non-sticking properties.

REFERENCE SIGNS LIST

30: acrylic rubber molded product
31: protrusion

The invention claimed is:

1. An acrylic rubber composition comprising:
an acrylic rubber (A) and
a fluororesin (B),
the fluororesin (B) being a perfluororesin,
wherein the acrylic rubber (A) comprises a polymerized unit based on at least one acrylate selected from the group consisting of butoxy ethyl acrylate and methoxy ethyl acrylate, and
the acrylic rubber composition comprises a co-coagulated composition obtained by co-coagulating the acrylic rubber (A) and the fluororesin (B).

2. The acrylic rubber composition according to claim 1, wherein the fluororesin (B) is at least one selected from the group consisting of tetrafluoroethylene/hexafluoropropylene copolymers, tetrafluoroethylene/hexafluoropropylene/perfluoro(alkyl vinyl ether) copolymers, and tetrafluoroethylene/perfluoro(alkyl vinyl ether) copolymers.

3. An acrylic rubber molded product obtainable by cross-linking the acrylic rubber composition according to claim 1.

4. A method of producing an acrylic rubber molded product comprising:
(I) co-coagulating an acrylic rubber (A) and a fluororesin (B) that is a perfluororesin to provide a co-coagulated composition and then producing the acrylic rubber composition according to claim 1;
(II) molding and cross-linking the acrylic rubber composition to provide a cross-linked molded product; and
(III) heating the cross-linked molded product to a temperature equal to or higher than a melting point of the fluororesin (B) to provide an acrylic rubber molded product.

5. An acrylic rubber molded product obtainable by the method according to claim 4.

6. The acrylic rubber molded product according to claim 3,
wherein the acrylic rubber molded product has protrusions on a surface thereof,
the area ratio of regions having protrusions to the surface of the acrylic rubber molded product is 0.04 or greater,
the volume ratio of the fluororesin (B) to the acrylic rubber molded product is 0.03 to 0.45, and
the area ratio of regions having protrusions is at least 1.1 times the volume ratio of the fluororesin (B).

7. The acrylic rubber molded product according to claim 6,
wherein the protrusions substantially consist of the fluororesin (B) in the acrylic rubber composition.

8. The acrylic rubber molded product according to claim 6,
wherein the protrusions have a height of 0.1 to 30.0 μm.

9. The acrylic rubber molded product according to claim 6,
wherein the protrusion have a bottom cross-sectional area of 0.1 to 2000 μm$^2$.

10. The acrylic rubber molded product according to claim 6,
wherein the number of protrusions is 500 to 60,000 per mm$^2$.

11. The acrylic rubber molded product according to claim 3 which is a sealing material.

* * * * *